Patented Dec. 16, 1930

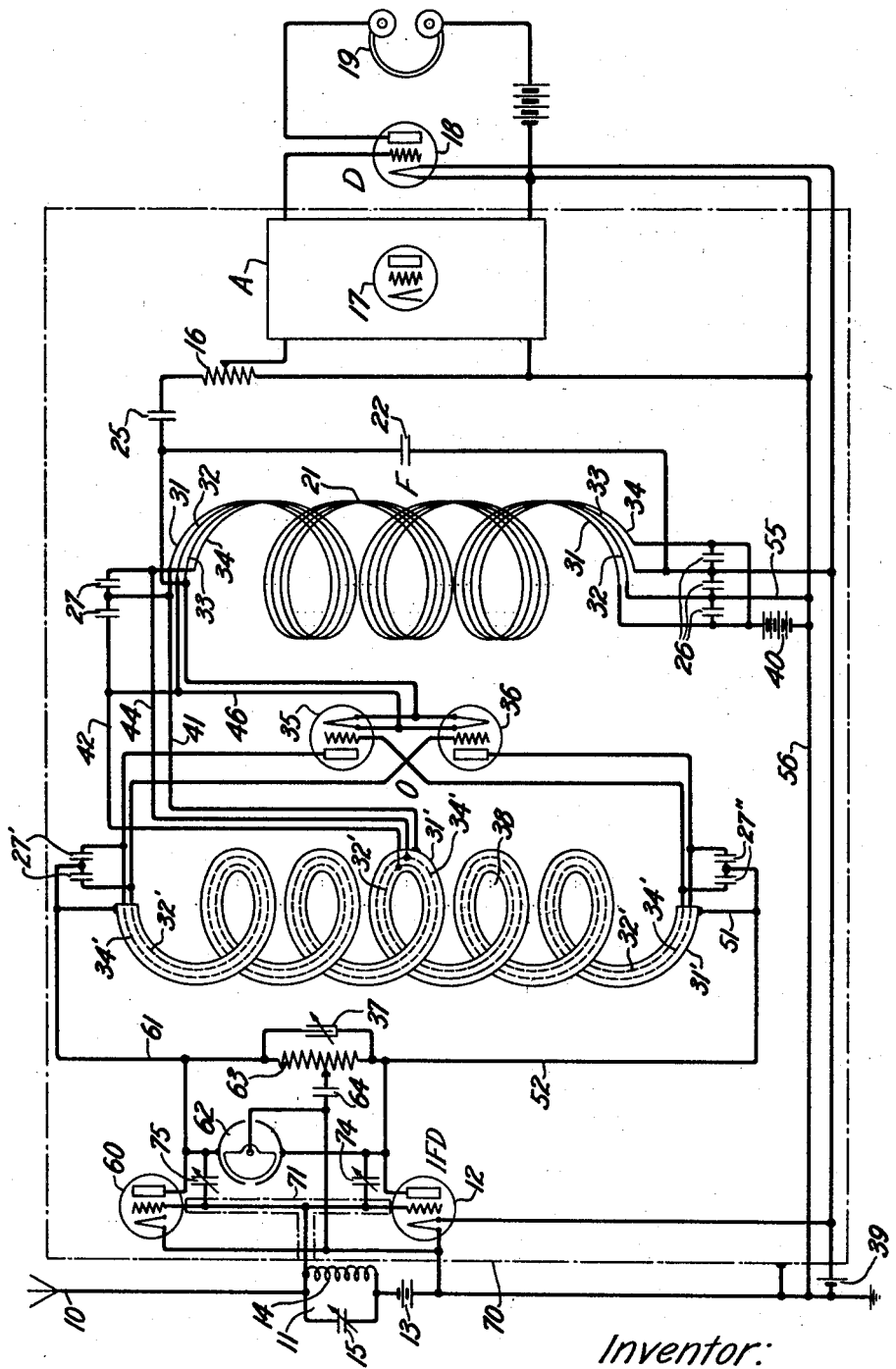

1,784,874

UNITED STATES PATENT OFFICE

FRANK A. HUBBARD, OF ISLIP, NEW YORK, ASSIGNOR TO BELL TELEPHONE LABORATORIES, INCORPORATED, OF NEW YORK, N. Y., A CORPORATION OF NEW YORK

CONTROL OF WAVE TRANSMISSION

Application filed May 26, 1926. Serial No. 111,730.

This invention relates to controlling transfer of waves between wave transmission paths, and relates especially to balancing and coupling electric circuits, as for example circuits of electric space discharge devices.

An object of the invention is to prevent undesired reactions between coupled circuits, as for example between output and input circuits of an electric space discharge device. In an application of Harald T. Friis, Serial No. 104,619, filed April 26, 1926, it is proposed to balance out or neutralize undesired coupling, afforded by plate-grid capacity of an electric space discharge detecter tube, between the input circuit of the tube and a heterodyne oscillator coupled to the output circuit of the tube. The system there disclosed is a double detection radio signal receiving system for receiving and detecting radio telephone or telegraph signals, and while of general application, is especially suitable for receiving very high frequencies, as for example radio frequencies in a range extending up to at least a frequency of the order of twenty megacycles per second. The double detection radio receiver includes a vacuum tube oscillator of the type disclosed in U. S. Patent 1,356,763, October 26, 1920 to R. V. L. Hartley, in a push-pull form. The oscillator tuned circuit is connected directly in the anode circuit of the first detector tube, and the oscillator frequency determining or tuning coil performs the added function of a balancing inductance, the middle of the coil being connected to the oscillator tube filaments, one terminal of this coil being connected to the anode of the detector tube and its opposite terminal being connected to the grid of the detector tube through a balancing condenser having a capacity of the value of the grid-plate capacity of the detector tube. This balancing condenser balances the grid-plate capacity of the detector tube, tending to neutralize the effect of the latter capacity in coupling the oscillator to the input circuit of the detector, so that reaction between the oscillator and the input circuit of the detector is reduced, hence tuning difficulties are avoided and radiation of locally generated waves from the antenna is prevented.

In accordance with the present invention there is provided, in addition to a capacity for balancing the grid-plate capacity of the detector tube, an impedance for balancing the effect of the plate-filament impedance of the detector tube which tends to cause a transfer of energy from the oscillator through the grid-plate impedance of the detector to the input circuit thereof. Without such balancing impedance, the effective impedances between the center and the two ends of the oscillator coil are different from each other, and such impedance unbalance is not compensated by the balancing condenser.

In the specific form of the invention shown in the accompanying drawing a balancing tube has its grid and filament connected to the grid and filament, respectively, of the detector tube, and is substantially like the detector tube, but has its filament unheated and is therefore inactive. The grid-plate capacity of the inactive tube balances the grid-plate capacity of the detector tube, tending to neutralize the effect of the latter capacity in coupling the oscillator to the input circuit of the detector. The anode-cathode capacity of the detector tube, which is in shunt to only one-half of the balancing coil included in the oscillator circuit, is balanced by the anode-cathode capacity of the auxiliary tube, since the latter capacity is connected across the other half of the balancing coil. A variable condenser is employed to counteract any remaining unbalance of capacity across the two halves of the coil; and a variable resistance is employed to compensate for unbalance of resistance across the two halves of the coil. This unbalance occurs because the space path of the detector tube is effectively in shunt to only one-half of the coil. The auxiliary tube being inactive for reasons pointed out hereinafter, does not have a space path impedance equivalent to that of the detector tube and hence does not compensate this unbalance. Where it is desired to use a simple condenser instead of the grid-plate capacity of an auxiliary tube, to balance the grid-plate capacity of the detector tube in the manner disclosed in the Friis application referred to above, the variable condenser and the variable resistance just mentioned may still serve to balance the plate-filament capacity and the plate-filament resistance of the detector tube.

It has heretofore been proposed to balance the grid-plate capacity of an amplifier tube by the grid-plate capacity of another tube. However, either the other tube had not its filament connected to the filament of the amplifier tube, and the effect of the plate-filament impedance of the amplifier tube in preventing the balancing of the amplifier grid-plate capacity was not overcome, or else the filament of the other tube was heated, whereas in the system specifically shown and described herein the balancing or auxiliary tube should be inactive, as indicated above.

Other objects and features of the invention will be apparent from the following description and claims.

The single figure of the drawing is a diagrammatic representation of the system referred to above.

In the system shown in the drawing, an antenna circuit including an open antenna 10 and a circuit 11 is connected to an intermediate frequency detector tube 12 of a double detection receiver, a battery 13 being shown as a source of biasing potential for the grid of tube 12. The circuit 11 includes an inductance 14 in parallel with a variable tuning condenser 15. The double detection receiver includes in addition to the tube 12 a beating or heterodyne oscillator O of a push-pull type, an intermediate frequency filter F, an attenuating or gain control device 16, an intermediate frequency amplifier A indicated by an electron space discharge tube 17, a low frequency detector 18, and a signal indicating device shown as a telephone receiver 19. The intermediate frequency detector tube 12 is designated IFD. The filter F comprises an inductance 21 and a condenser 22.

The intermediate frequency filter F is shown as a parallel resonant circuit tuned to the intermediate frequency and connected across the input side of the attenuator 16 through a large capacity coupling condenser 25 which prevents steady potentials from being supplied to the grid of the intermediate frequency amplifier by a space current battery 40. The coil 21 comprises a wire having four insulated strands 31, 32, 33 and 34 closely magnetically coupled and connected together at their lower ends by condensers 26 and at their upper ends by condensers 27 and the low impedance path provided by the filaments of the oscillator tubes. For alternating current, the coil with the four strands constitutes one coil or winding, although the several strands are used as several paths for direct currents for supplying heating current to the filaments of electron discharge tubes (described below) employed in the oscillator O, and for supplying direct current to the plate circuits of both the oscillator and the intermediate frequency detector tubes 12.

The oscillator O is of the general type disclosed in R. V. L. Hartley Patent 1,356,763, October 26, 1920. However, it comprises two electron discharge tubes 35 and 36 connected in push-pull relationship and has a frequency determining circuit for the oscillator which comprises a variable condenser 37 connected in parallel with a multi-strand coil 38 somewhat similar to the coil 21. Filament current is supplied from a source 39 through the strands 32 and 33 of coil 21, and space current for tubes 35 and 36 is supplied from a source 40 through the strand 34 of coil 21. Plate current for tube 35 passes between the strand 34 and the plate of that tube through a conductor 44 and the upper half of an insulated wire strand 34' of coil 38. Plate current for tube 36 passes between strand 34 and the plate of that tube through the conductor 44 and the lower half of strand 34'.

The coil 38 comprises, in addition to the strand 34', an insulated wire strand 32' and a coil or helix of copper tubing 31' inclosing the wires 34' and 32' and forming a conductor of very low resistance for high frequency waves. Coils 31', 32' and 34' have their mid-points interconnected by condensers 27 and conductors 41, 42 and 44, their upper ends interconnected by condensers 27', and their lower ends interconnected by condensers 27''. For alternating current the coil with the three direct current paths constitutes one coil or winding the strands of which are closely coupled electromagnetically. The upper and lower ends of strand 32' are connected to the grids of tubes 36 and 35 respectively, and the mid-point of this strand is conductively connected, through conductors 42 and 46, to the filaments of these tubes. Thus the upper half of coil 32' forms part of a conductive path for fixing the average potential of the grid of tube 36 with reference to its filament, and the lower half of coil 32' forms part of a conductive path for fixing the average potential of the grid of tube 35 with reference to its filament.

Regarding the frequency determining circuit of the oscillator, the coil 38 across which the condenser 37 is connected extends between the plate and grid of tube 35 and between the plate and grid of tube 36, and for alternating current the filaments of these tubes are connected to the mid-point of this coil by lead 46, the connection to certain of the strands being through one or more of the condensers 27. The by-pass condensers 26, 27, 27' and 27'' are all of low or negligible impedance at the intermediate frequency, to which filter F is tuned, which may be, for example, of the order of 600,000 cycles per second, as well as for the frequency of the oscillator O, which may be, for example, of the order of forty million cycles per second. The resistance and the inductance of the coil 38 for alternating current are substantially the resistance and the inductance of coil 31'; and the resistance and inductance of each half of coil 38 for alternating current are substantially the resistance and inductance of half of coil 31'.

Direct plate current for the tube 12 of the intermediate frequency detector is supplied from source 40 through the strand 31 of coil 21, conductor 41, coil 31', and conductors 51 and 52 to the plate of tube 12, the filament of this tube being grounded as indicated. If desired the strand 31 and the strand 34 may be connected to points of different potential on source 40, so that the direct current plate voltage for the oscillator tubes will be different from that for the tube 12.

The lower half of coil 38 is serially included in the alternating current output circuit of tube 12. Waves received by the antenna are supplied to the input circuit of detector tube 12 and are repeated in the output circuit of this tube. The alternating current output circuit of tube 12 may be traced as follows: from the grounded filament of tube 12, through its space path to the anode, through conductor 52, through conductor 51, through the lower half of coil 38 to conductors 41, 42 and 44 and condensers 27 and conductor 46 and the oscillator filaments which are all at substantially the same alternating potential, and through coil 21 and condenser 22 in parallel with each other to condensers 26 at the lower end of coil 21, which are directly grounded through leads 55 and 56.

Thus, in the operation of the system for receiving, for example, radio telephone or telegraph signals transmitted to the antenna 10 as a carrier wave modulated by signal waves of frequencies in the audible frequency range, the modulated carrier wave, received from the antenna circuit and amplifier by tube 12, modulates or is modulated by the waves supplied by the beating oscillator in the anode or output circuit of tube 12. One of the modulation products, the so called intermediate frequency, is a signal modulated carrier wave of a frequency equal to the difference between the carrier frequency and the oscillator frequency. This difference will ordinarily be small compared to the carrier frequency received by the antenna. This intermediate frequency in the output circuit of tube 12 passes the intermediate frequency filter F and reaches the attenuator 16, whereas other frequencies are suppressed by the filter F and not transmitted to the intermediate frequency amplifier. The intermediate frequency waves, attenuated to the desired extent by the attenuator, are supplied to the input circuit of the intermediate frequency amplifier A, which may be of any suitable type. The amplified waves are transmitted from the output circuit of amplifier A to the input circuit of the low frequency detector 18, which detects the amplified wave to yield the audible frequency signal waves, so that they are audible in the telephone 19.

Although in the ordinary Hartley oscillator the phase difference between the voltages on the grid and plate is not exactly 180°, the phase difference between the grid and plate voltages of each tube of the oscillator disclosed herein is 180°. In the circuit shown in the drawing, advantage is taken of this 180° phase difference to obtain a balanced connection of the oscillator to the tube 12 with respect to the input circuit of the tube 12, or in other words to balance out the coupling between the beating oscillator circuit and the input circuit to tube 12. This results in simplifying the tuning operation, preventing the radiation of locally supplied oscillations from the antenna, and reducing the tendency of tube 12 to sing. In accordance with the present invention this balancing is accomplished in a manner which will now be described.

An inactive vacuum tube 60 substantially like the tube 12, has its grid and its filament connected to the grid and the filament, respectively, of tube 12, and has its plate connected to a conductor 61 leading to the upper end of coil 38, the voltage of which is opposite in phase to the voltage of the lower end of the coil. The description of tube 60 as inactive means that it does not amplify the waves impressed across its grid and filament. As shown, its filament is not heated.

The grid-anode capacity of tube 60 constitutes a balancing capacity for the grid-anode capacity of tube 12, tending to prevent voltage from the beating oscillator from appearing between the grid and filament of tube 12 due to the internal plate-to-grid capacity of tube 12, and tending to reduce reaction upon the beating oscillator of any changes in the impedance of the input circuit of tube 12. The inductance coil 38 serves as a balancing coil.

Since the cathode of tube 60 is connected to the cathode of tube 12, the anode-cathode capacity of tube 12, which is effectively in shunt to only one-half of the balancing coil 38 included in the oscillator circuit, is balanced by the anode-cathode capacity of the auxiliary tube 60, which is connected effectively across the other half of the balancing coil.

As a further means of securing accurate balance, the fixed plates of an adjustable condenser 62 are connected across the outer terminals of the balancing coil and the adjustable plate of this condenser is connected to the detector cathode. This cathode is at substantially the potential of the mid-point of the coil, with respect to waves of frequency of the order of the frequency to which the antenna is tuned. Any remaining unbalance of capacity across the halves of the coil caused, for example, by small differences in the detector and balancing tubes can thus be counteracted by proper adjustment of this condenser.

In addition, a high resistance 63 is shunted across the balancing coil, and a conductor which includes a large capacity blocking condenser 64, for preventing passage of direct current therethrough, has one end connected to the detector filament and has its other end adjustable along the resistance to compensate for the unbalance caused by the cathode-anode resistance of the detector. This means is provided especially because the auxiliary tube, being inactive, has no equivalent plate-cathode resistance. Even if the filament of the auxiliary tube were energized, a considerable difference in the anode-cathode resistances of the detector tube and the auxiliary tube might exist. The cathode of the auxiliary tube is not heated, because, if that tube were active, the intermediate frequency waves from that tube and tube 12 would mutually neutralize.

A grounded metallic shield 70, which may be of copper, for example, incloses the oscillator, the intermediate frequency amplifier and the tubes 12 and 60, to prevent stray electromagnetic or electrostatic fields from the oscillator from affecting the antenna circuit or the input circuits of the tubes 12 and 60; and the conductors connecting the grids of tubes 12 and 60 to the antenna circuit are surrounded by an additional grounded metallic shield 71 of similar material to shield them from any stray fields from the oscillator. The shields 70 and 71 tend to assist in the suppression of undesired reaction between the oscillator and the input circuit of the intermediate frequency amplifier. The effect of any stray field from the oscillator upon the input circuit of tube 12 is not balanced or neutralized by the tube 60, because the latter tube is inactive.

Any differences between the anode-cathode capacities or resistances of tubes 12 and 60 would tend to unbalance the effective impedances between the center and the two ends of the oscillator coil, which the anode-grid capacity of tube 60 is incapable of compensating.

Although, for any one given frequency, an unbalance of plate-grid capacities of tubes 12 and 60 might be compensated, as regards coupling between the oscillator and the detector input circuit, by an unbalance of plate-filament capacities of the tubes 12 and 60, this compensation would not hold good over a wide range of frequencies. However, by providing separate balancing means for the plate-grid capacities and the plate-filament capacities, the balance may be made effective over a wide frequency range, the plate-filament resistances over such frequency range being balanced by the resistance 63 when the contact movable thereover, has once been adjusted to the proper setting.

If desired, small variable condensers 74 and 75 may be connected across the plate and grid of tubes 12 and 60, respectively. The capacity of these condensers merges with the internal grid-plate capacity of the associated tubes and enables the capacity between the grid and plate to be adjusted to compensate for inherent differences in the internal capacities of the respective tubes.

The connection of the filaments of the oscillator tubes to the grounded heating current source 39 through the conductors 32 and 33 of coil 21 maintains these filaments at the required high potential above ground for the waves of the intermediate frequency, since the reactive voltage drop in coil 21 is high for the intermediate frequency.

The intermediate frequency amplifier A may be of any suitable type, and with the antenna and the oscillator tuned to frequencies $f$ and $f'$, respectively, having the values, for example, $f = 20 \times 10^6$ cycles per second and $f' = f \pm 600$ kilocycles per second, the resonant frequency of the intermediate frequency amplifier may be 600 kilocycles per second and its band width about 20 to 30 kilocycles per second. This broad band eliminates "hair line" tuning at high signaling frequencies.

A wave receiving circuit having a push-pull heterodyne oscillator so coupled to a detector as to modulate in the plate circuit of the detector and to compensate for coupling between the oscillator and the detector input circuit, due to inter-electrode capacity in the detector tube, is claimed in the copending application of Harald T. Friis, referred to above. That application claims also the oscillator with the inductance 21 and the attenuator 16 operating at the intermediate frequency. The oscillator per se is claimed in H. T. Friis application, Serial No. 267,086, filed April 3, 1928, entitled High frequency oscillation generators, which is a division of the application, Serial No. 104,619 referred to above.

What is claimed is:

1. A vacuum tube translating device having input and output circuits, and means for coupling said circuits to each other, said means comprising an oscillator including two electric space discharge devices connected in push-pull relation, said means also including a variable condenser effectively connected across the plate and filament of said vacuum tube translating device.

2. A vacuum tube translating device having input and output circuits, and means for coupling said circuits to each other, said means comprising an oscillator including two electric space discharge devices connected in push-pull relation, said means also including a variable condenser and a resistance, each effectively connected across the plate and filament of said vacuum tube translating device.

3. In combination, an oscillator comprising two electric space discharge tubes connected in push pull relationship each having an anode and a cathode, electric space discharge devices having anode electrodes, cathode electrodes and grid electrodes, said grid electrodes being connected together, one of said devices having an output circuit connected across the anode and the cathode of one of said tubes, the other of said devices having an output circuit connected across the anode and the cathode of the other of said tubes, and means for reducing the effective voltage produced on said grid electrodes by said oscillator, said last means comprising an impedance connected across two of said electrodes of said devices.

4. In combination, an oscillator comprising two electric space discharge tubes connected in push pull relationship each having an anode and a cathode, electric space discharge devices having anode electrodes, cathode electrodes and grid electrodes, said grid electrodes being connected together, one of said devices having an output circuit connected across the anode and the cathode of one of said tubes, the other of said devices having an output circuit connected across the anode and the cathode of the other of said tubes, and means for reducing the effective voltage produced on said grid electrodes by said oscillator, said last means comprising a resistance, connected across one of said output circuits.

5. In combination, an oscillator comprising two electric space discharge tubes connected in push pull relationship each having an anode and a cathode, electric space discharge devices having anode electrodes, cathode electrodes and grid electrodes, said grid electrodes being connected together, one of said devices having an output circuit connected across the anode and the cathode of one of said tubes, the other of said devices having an output circuit connected across the anode and the cathode of the other of said tubes, and means for reducing the effective voltage produced on said grid electrodes by said oscillator, said last means comprising a capacity, connected across one of said output circuits.

6. The combination set forth in claim 3, in which said cathode electrodes are connected together.

7. In combination, an oscillator comprising two electric space discharge tubes connected in push pull relationship each having an anode and a cathode, electric space discharge devices having anode electrodes, cathode electrodes and grid electrodes, said grid electrodes being connected together, one of said devices having an output circuit connected across the anode and the cathode of one of said tubes, the other of said devices having an output circuit connected across the anode and the cathode of the other of said tubes, one of said devices being inactive to conduct current between its anode and cathode electrodes, and means for reducing the effective voltage produced on said grid electrodes by said oscillator, said last means comprising a resistance, connected across one of said output circuits.

8. In a space discharge tube system, a space discharge detector having a grid, an anode and a cathode, associated grid and anode circuits therefor, a source of waves coupled to the anode circuit, and a resistance and capacity balancing the anode-cathode resistance and an inter-electrode capacity of said detector for rendering the grid and anode circuits of said detector conjugate with respect to each other for waves supplied by said source.

9. In combination, a three electrode space discharge device having an input and an output circuit, a source of oscillations in said output circuit, means to balance out the effect of said oscillations from the input circuit of said space discharge device, said balancing means comprising a vacuum tube having its grid and cathode connected to the grid and cathode of said space discharge device, and auxiliary means comprising variable impedances joining the output circuits of said vacuum tube and said space discharge device exactly to compensate the internal capacity and impedance of said space discharge device.

10. A coupling device for space discharge tubes comprising a space discharge detector tube having inter-electrode capacity, a tuned circuit including an inductance coil and a condenser in shunt thereto, a space discharge oscillator, said tuned circuit constituting the frequency determining element of the space discharge oscillator, and means adapted to cause said circuit to function as a balancing circuit for said space discharge tube detector to prevent energy supplied by said oscillator from reacting on the detector input circuit, said means comprising a tube which has a cathode inactive to emit electrons and which has its output side in push-pull relation to the output side of said detector.

11. A coupling device for space discharge tubes comprising a space discharge detector tube having inter-electrode impedance, a tuned circuit including an inductance coil and a condenser in shunt thereto, a space discharge oscillator, said tuned circuit constituting the frequency determining element of the space discharge oscillator, and means adapted to cause said circuit to function as a balancing circuit for said space discharge tube detector to prevent energy supplied by said oscillator from reacting upon the detector input circuit, said means comprising a tube which has a cathode inactive to emit electrons and which has its output side in push-pull relation to the output side of said detector, said detector and said tube having their grids and filaments connected directly together, adjustable condensers and adjustable resistances effectively bridging the plate-to-filament paths of said tubes exactly to compensate for differences in their interelectrode impedances.

In witness whereof, I hereunto subscribe my name this 22 day of May A. D., 1926.

FRANK A. HUBBARD.